US012778012B2

(12) United States Patent
Fay, II

(10) Patent No.: US 12,778,012 B2
(45) Date of Patent: Nov. 3, 2026

(54) MOWER-CONDITIONER HAVING FINS ON CONTROL SURFACES

(71) Applicant: CNH Industrial America LLC, New Holland, PA (US)

(72) Inventor: Jeffrey Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 749 days.

(21) Appl. No.: 17/953,776

(22) Filed: Sep. 27, 2022

(65) Prior Publication Data

US 2024/0099194 A1 Mar. 28, 2024

(51) Int. Cl.
*A01D 43/10* (2006.01)

(52) U.S. Cl.
CPC .................................... *A01D 43/10* (2013.01)

(58) Field of Classification Search
CPC ...................................................... A01D 43/10
See application file for complete search history.

(56) References Cited

U.S. PATENT DOCUMENTS

| | | | | |
|---|---|---|---|---|
| 2,708,582 | A * | 5/1955 | Adams | A01F 12/40 239/650 |
| 4,739,609 | A * | 4/1988 | Meier | A01D 43/10 56/192 |
| 10,182,527 | B2 | 1/2019 | Jespersen | |
| 10,477,774 | B2 * | 11/2019 | Hill | A01D 43/105 |
| 10,912,255 | B2 | 2/2021 | Rotole et al. | |
| 2011/0302897 | A1 * | 12/2011 | Hoffman | A01D 43/10 56/192 |
| 2017/0265390 | A1 * | 9/2017 | Panoushek | A01D 41/1243 |
| 2021/0267121 | A1 | 9/2021 | Childs | |

* cited by examiner

*Primary Examiner* — William D Hutton, Jr.
*Assistant Examiner* — Jose A. Martinez
(74) *Attorney, Agent, or Firm* — Buchanan Ingersoll & Rooney PC

(57) ABSTRACT

An agricultural machine system includes: an agricultural work vehicle including an agricultural work vehicle frame; a mower-conditioner machine coupled with the agricultural work vehicle frame and including: a mower-conditioner machine frame; a conditioner coupled with the mower-conditioner machine frame; a swath gate coupled with the mower-conditioner machine frame and configured for encountering a flow of a crop material; and a device coupled with the mower-conditioner machine frame, and including a plurality of fins configured for directing a flow of the crop material from the conditioner.

19 Claims, 6 Drawing Sheets

MOWER-CONDITIONER HAVING FINS ON CONTROL SURFACES

FIELD OF THE INVENTION

The present invention pertains to agricultural machine systems, and, more specifically, to mower-conditioner machines.

BACKGROUND OF THE INVENTION

Generally speaking, forage (which can also be referred to herein as crop, crop material, forage crop, forage material, or forage crop material) is plant material that can be harvested and provided to livestock or other animals as fodder, including but not limited to cattle, sheep, goats, and horses, during, for example, the winter or at other times when pasture land has inadequate amounts of vegetation for livestock or other animals. Depending upon the processing of the forage, forage can be formed into hay or silage. Both hay and silage can be made from grass and legumes (or mixtures thereof), and silage can also be made from, for example, corn or wheat. Hay (whether grass hay, legume hay, or a mixture thereof) results from a process that includes planting (though the plant matter is often perennial), growing, cutting, drying, and storing. Depending upon location, grass hay can include, for example, orchard grass, timothy, fescue, brome, Bermuda grass, Kentucky bluegrass, and/or ryegrass, whereas legume hay can include, for example, alfalfa, clover, and/or birdsfoot trefoil. Silage (which can, at least in some circumstances, also be referred to as haylage) can involve causing the crop material to ferment.

Further, depending upon the desired end product with respect to the forage (i.e., hay or silage), a variety of forage processing operations can be involved, and these forage processing operations include haymaking operations and silage-making operations. Haymaking operations, for example, can include planting, cutting (which can be referred to as mowing), conditioning, tedding, raking, merging, chopping, baling, bale retrieval, transport, and/or storage, and silage-making operations can include not only planting and cutting but also chopping, baling, and/or ensiling (or at least some sort of covering). A variety of agricultural harvesting machines can be used to perform these operations. Such agricultural machines include planters, mowers, mower-conditioners, tedders, rakes, mergers, choppers, balers, and bale retrievers.

As indicated, one such agricultural harvesting machine is a mower-conditioner machine (which can also be referred to as a mower-conditioner). Such mower-conditioner machines can be formed as a header attachment to a self-propelled windrower, or, alternatively, a pull-type mower-conditioner coupled with a tractor. Farmers may operate such mower-conditioners to cut any sort of crop material (hay crop, wheat, etc.) from a field, to immediately condition the crop material, and to deposit the cut crop into swaths or windrows on the field. The cutting can be performed by a cutting mechanism of the mower-conditioner, the cutting mechanism (which can also be referred to as a cutter bar) being, for example, a series of rotary discs (which can be referred to as discs), or a sicklebar. Such conditioning can be performed by a pair of conditioning rolls (which can be referred to collectively as the conditioner) of the mower-conditioner, a crop mat flowing therebetween, and the conditioning can break, split, bend, crush, crack, and/or crimp the crop material, as is known. After conditioning the crop material, the crop material can engage a hood and, subsequently thereto, a swath gate of the mower-conditioner and, optionally, windrow shields of the mower-conditioner or the self-propelled windrower, before being deposited on the ground. The swath gate of the mower-conditioner can pivot up or down, such that when the swath gate is pivoted down the crop material is deposited on the ground in a wide swath, or such that when the swath gate is pivoted up the crop material can strike windrow shields and thereby be deposited in narrow windrows on the ground. Alternatively, the conditioning can be performed by a conditioner formed not as conditioning rolls but as flails, as is known.

Modern mower-conditioner machines can have a conditioner (including either a plurality of rolls (the roll type) or a plurality of flails (the flail type)) which has a transverse extent (that is, a width) that is very wide, for example, up to 125 inches thus can produce a crop mat of a substantially similar width projecting therefrom. Such a large width is desirable for faster and more uniform dry-down of the crop material. Further, such a width works well on center-pivot mower-conditioners (i.e., a center pivot disc mower-conditioner (CPDMC)), where a very wide swath can be deposited behind the CPDMC. However, if such a mower-conditioner, or one similar thereto (namely, in terms of such a width), is used as a header on the front of a self-propelled windrower (SPW), a problem arises. That is, the width of the crop material deposited on the ground (that is, the swath) is too wide to fit between the wheels of the self-propelled windrower, which typically has a width between the wheels of 96 inches or less.

What is needed in the art is an effective way to provide that the width of a swath of crop material is narrower than the width of the conditioner, and that the swath is still uniform in cross-section.

SUMMARY OF THE INVENTION

The present invention provides an agricultural machine system including a mower-conditioner machine with a device including a plurality of fins configured for directing a flow of the crop material from the conditioner so as to narrow the width of that flow.

The invention in one form is directed to an agricultural machine system, including: an agricultural work vehicle including an agricultural work vehicle frame; a mower-conditioner machine coupled with the agricultural work vehicle frame and including: a mower-conditioner machine frame; a conditioner coupled with the mower-conditioner machine frame; a swath gate coupled with the mower-conditioner machine frame and configured for encountering a flow of a crop material; and a device coupled with the mower-conditioner machine frame, and including a plurality of fins configured for directing a flow of the crop material from the conditioner.

The invention in another form is directed to a mower-conditioner machine of an agricultural machine system, the agricultural machine system including an agricultural work vehicle including an agricultural work vehicle frame, the mower-conditioner machine being coupled with the agricultural work vehicle frame, the mower-conditioner machine including: a mower-conditioner machine frame; a conditioner coupled with the mower-conditioner machine frame; a swath gate coupled with the mower-conditioner machine frame and configured for encountering a flow of a crop material; and a device coupled with the mower-conditioner machine frame, and including a plurality of fins configured for directing a flow of the crop material from the conditioner.

The invention in yet another form is directed to a method of using an agricultural machine system, the method including the steps of: providing the agricultural machine system, which includes an agricultural work vehicle and a mower-conditioner machine, the agricultural work vehicle including an agricultural work vehicle frame, the mower-conditioner machine being coupled with the agricultural work vehicle frame and including a mower-conditioner machine frame, a conditioner coupled with the mower-conditioner machine frame, a swath gate coupled with the mower-conditioner machine frame and configured for encountering a flow of a crop material, and a device coupled with the mower-conditioner machine frame; and directing, by a plurality of fins of the device, a flow of the crop material from the conditioner.

An advantage of the present invention is that it provides a way to narrow the width of a swath of the crop material flowing from the conditioner.

Another advantage of the present invention is that it provides a way to converge the crop material into a narrower package that has a width that is narrow enough to fit between the wheels of a self-propelled windrower (for example, 96 inches or less) and still be uniform in cross-section.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with an agricultural vehicle, an agricultural machine, and/or components thereof are usually determined with reference to the direction of forward operative travel of the agricultural vehicle and/or agricultural machine, but they should not be construed as limiting. The terms "longitudinal" and "transverse" are determined with reference to the fore-and-aft direction of the agricultural vehicle and/or agricultural machine and are equally not to be construed as limiting. The terms "downstream" and "upstream" are determined with reference to the intended direction of crop material flow during operation, with "downstream" being analogous to "rearward" and "upstream" being analogous to "forward."

Figure 1:
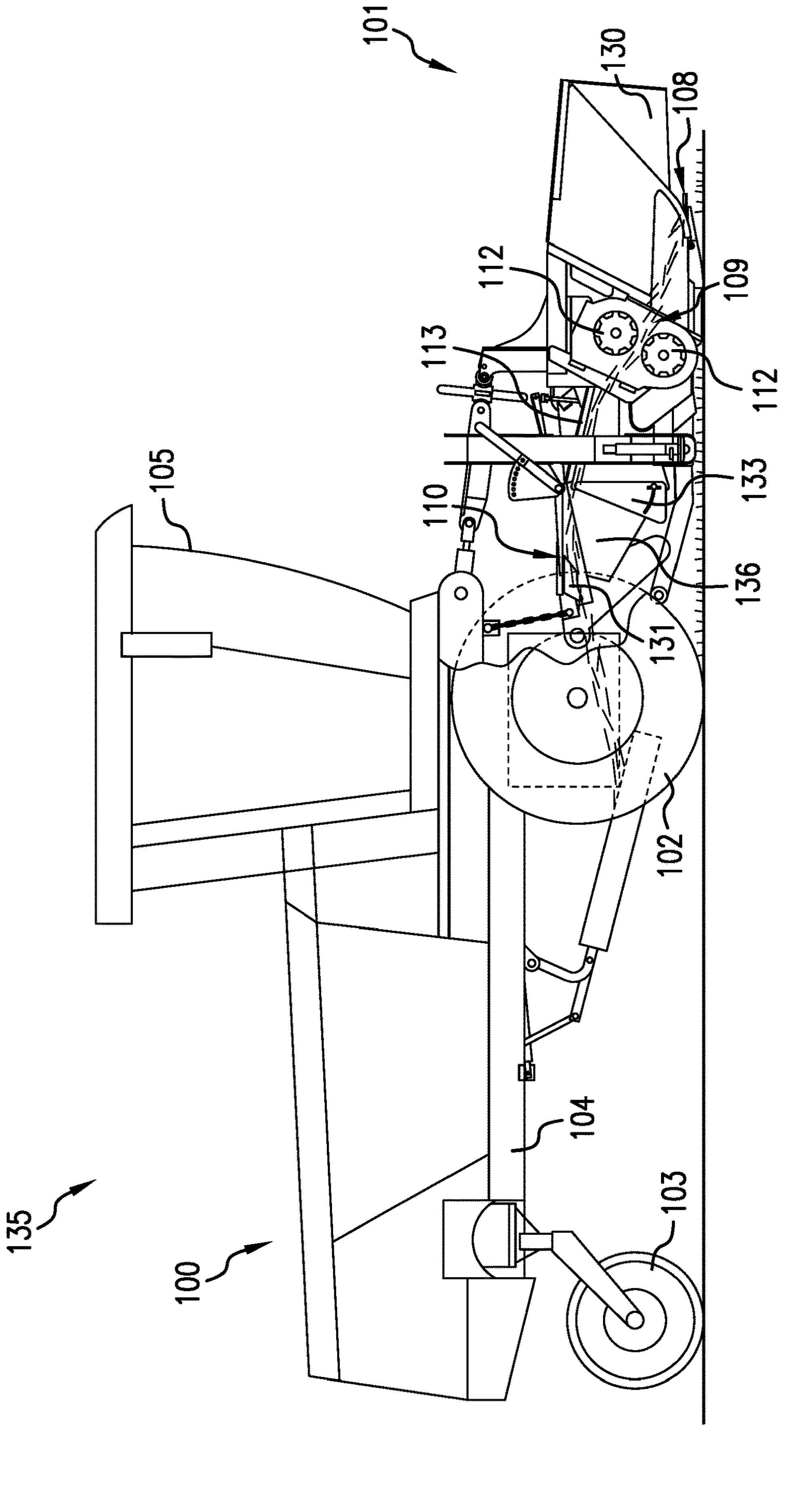
FIG. 1 illustrates schematically a side view of an exemplary embodiment of an agricultural machine system including an agricultural work vehicle, formed as a self-propelled windrower, and a mower-conditioner machine, in accordance with an exemplary embodiment of the present invention.

Referring now to the drawings, and more particularly to FIG. 1, there is shown an embodiment of an agricultural machine system 135 according to the present invention, system 135 including an agricultural work vehicle 100 (which can be referred to as a work vehicle, or an agricultural vehicle) and an agricultural machine 101 (which, at least in some embodiments of the present invention, can be referred to as an agricultural header, a header, an agricultural head, a head, an agricultural implement, or an implement), which is formed as a mower-conditioner machine 101 (which can be referred to as a mower-conditioner) and is being pushed by, and thus coupled with, agricultural work vehicle 100, agricultural machine 101 being configured for performing an agricultural operation within a field, namely, mowing and conditioning, in this embodiment of the present invention. As shown, work vehicle 100 can be configured as a self-propelled windrower (SPW). Though not shown, agricultural machine system 135 can include a control system for controlling any aspect of system 100, including mower-conditioner machine 101.

Work vehicle 100 can be an operator-driven SPW or an autonomous SPW. However, in some embodiments, work vehicle 100 may correspond to any other suitable vehicle configured to push a mower-conditioner machine across a field or that is otherwise configured to facilitate the performance of a mowing-conditioning operation, including an autonomous mower-conditioner vehicle. It should be appreciated that mower-conditioner 101, while shown as being pushed by SPW 100, may also be a self-propelled mower-conditioner that does not rely on a separate vehicle for propulsion and/or power to function. It should be further appreciated that work vehicle 100 may be configured as a tractor configured to tow mower-conditioner 101.

Work vehicle 100 includes a pair of front wheels 102, a pair of rear wheels 103, and a chassis 104 (which can also be referred to as an agricultural work vehicle frame 104 or SPW frame 104) coupled to and supported by the wheels 102, 103. An operator's cab 105 may be supported by a portion of the chassis 104 and may house various input devices for permitting an operator to control the operation of work vehicle 100 and/or mower-conditioner 101. Additionally, work vehicle 100 may include an engine and a transmission mounted on chassis 104. The transmission may be operably coupled to the engine and may provide variably adjusted gear ratios for transferring engine power to wheels 102 via a drive axle assembly. Though not shown, work vehicle 100 may be coupled to mower-conditioner 101 in part via a power take-off (PTO)(which includes a PTO shaft) and any other suitable other ways, including chains, or the like. As such, work vehicle 100 may, for example, guide mower-conditioner 101 toward crop material 136 standing in the field, such that mower-conditioner 101 in FIG. 1 is a push-type mower-conditioner 101.

Mower-conditioner 101 is coupled with vehicle frame 104 and is formed as a disc header for self-propelled windrower 100 (mower-conditioner 101 can be a center pivot disc mower-conditioner, according to one exemplary embodiment of the present invention). Mower-conditioner 101 includes frame 130, cutting mechanism 108, crop conditioner 109, a hood 113, and a pivotable swath gate 110 (cutting mechanism 108, crop conditioner 109, hood 113 (which can be referred to as a device 113), and swath gate

110 each being coupled with frame 130). Further, though not shown but as is generally known, a pair of windrow shields can be associated with mower-conditioner 101, and these windrow shields can be carried by SPW 100 or mower-conditioner 101. FIG. 1 shows an initial converging plate 133 (on the right side of mower-conditioner 101 (in the foreground of FIG. 1), but the corresponding converging plate 133 on the left side is not visible in FIG. 1), which is configured to facilitate the converging inwardly of crop material 136 exiting conditioner 109 at the lateral edges of conditioner 109.

Cutting mechanism 108 is configured for cutting standing crop material 136 and further conveying crop material 136 rearwardly. Cutting mechanism 108 can be configured as a plurality of rotating discs which sever crop material 136 (as shown in FIG. 1), or, alternatively, as a plurality of reciprocating knives (such as a sicklebar). In a crop flow direction, subsequent to cutting mechanism 108 crop material 136 encounters two conditioning rolls 112. Crop conditioner 109 includes two conditioner rolls 112 (which can also be referred to as conditioning rolls, and which are coupled with frame 130). Rolls 112 rotate opposite one another (in FIG. 1, the top roll 112 rotates clockwise, and the bottom roll 112 rotates counter-clockwise) and form a gap 113 therebetween (which can be referred to as a roll gap 113), through which the cut crop material 136 flows so as to be conditioned (i.e., breaking, splitting, bending, crushing, cracking, and/or crimping crop material 136). One or both conditioner rolls 112 can be driven, at least indirectly, by a mechanical input to mower-conditioner 101, such as by the PTO shaft, so as to impart a motive force to crop material 136 rearward. Thus, conditioner rolls 112 rotate with a speed (revolutions per minute (RPM)), which can be referred to as a conditioner speed (herein, unless specified otherwise, the conditioner speed refers to the angular velocity of rolls 112, wherein velocity and speed can be used interchangeably herein). Subsequent to conditioner rolls 112, an airborne mat of crop material 136 strikes, initially, an underside of hood 113 and, subsequently thereto, an underside of swath gate 110, in order to form a wide swath of crop material on the ground, or a narrower windrow, depending upon the positioning of swath gate 110. Thus, hood 113 is positioned upstream of swath gate 110, and hood 113 and swath gate 110 are each configured for encountering the flow of crop material 136. Further, hood 113 and swath gate 110 each include a plurality of fins 131, 332 (fins 131 being attached to swath gate 110, and fins 332 being attached to hood 113 (FIG. 3), fins 332 not being visible in FIG. 1) which are configured for directing the flow of crop material 136, as explained further below. Further, subsequent to swath gate 110, crop material 136 can optionally strike windrow shields 111 (which can also be referred to as side shields), which can be positioned so as to form a windrow of crop material 136 on the ground.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of mower-conditioner 101 described above and shown in FIG. 1 is provided only as one example. Thus, it should be appreciated that the present disclosure may be readily adaptable to any manner of mower-conditioner configuration, or other agricultural machines, such as a vehicle and/or implement.

Figure 2:
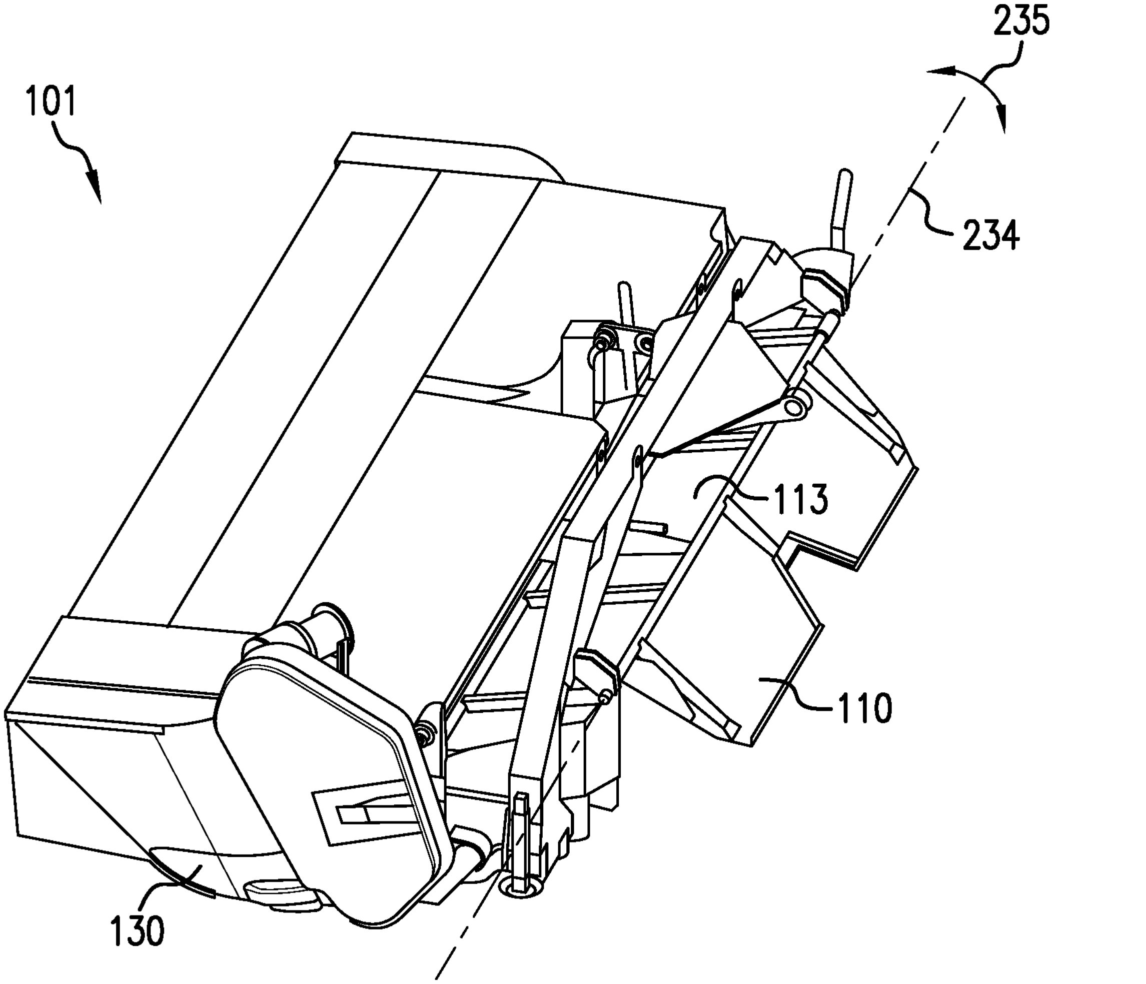
FIG. 2 illustrates schematically a top perspective view of the mower-conditioner machine of FIG. 1, with portions broken away, in accordance with an exemplary embodiment of the present invention.

Referring now to FIG. 2, there is shown a top perspective view of mower-conditioner 101, with portions broken away. The forward end of mower-conditioner 101 is to the left of the page of FIG. 1. Mower-conditioner 101 is shown to include hood 113 and swath gate 110. Hood 113 is fixed (stated otherwise, rigid) relative to frame 130 and thus also with respect to conditioner 109. Swath gate 110 is configured for pivoting relative to frame 130 about pivot axis 234, as indicated by double-arrow 235. Thus, swath gate 110 is configured for moving relative to hood 113. Thus, as is known, swath gate 110 of the mower-conditioner 101 can pivot up or down, such that when swath gate 110 is pivoted down crop material 136 is deposited on the ground in a wide swath, or such that when swath gate 110 is pivoted up crop material 136 can strike windrow shields and thereby be deposited in narrow windrows on the ground; in this way, swath gate 110 can be used to control a height of crop material 136 deposited on the ground.

Figure 3:
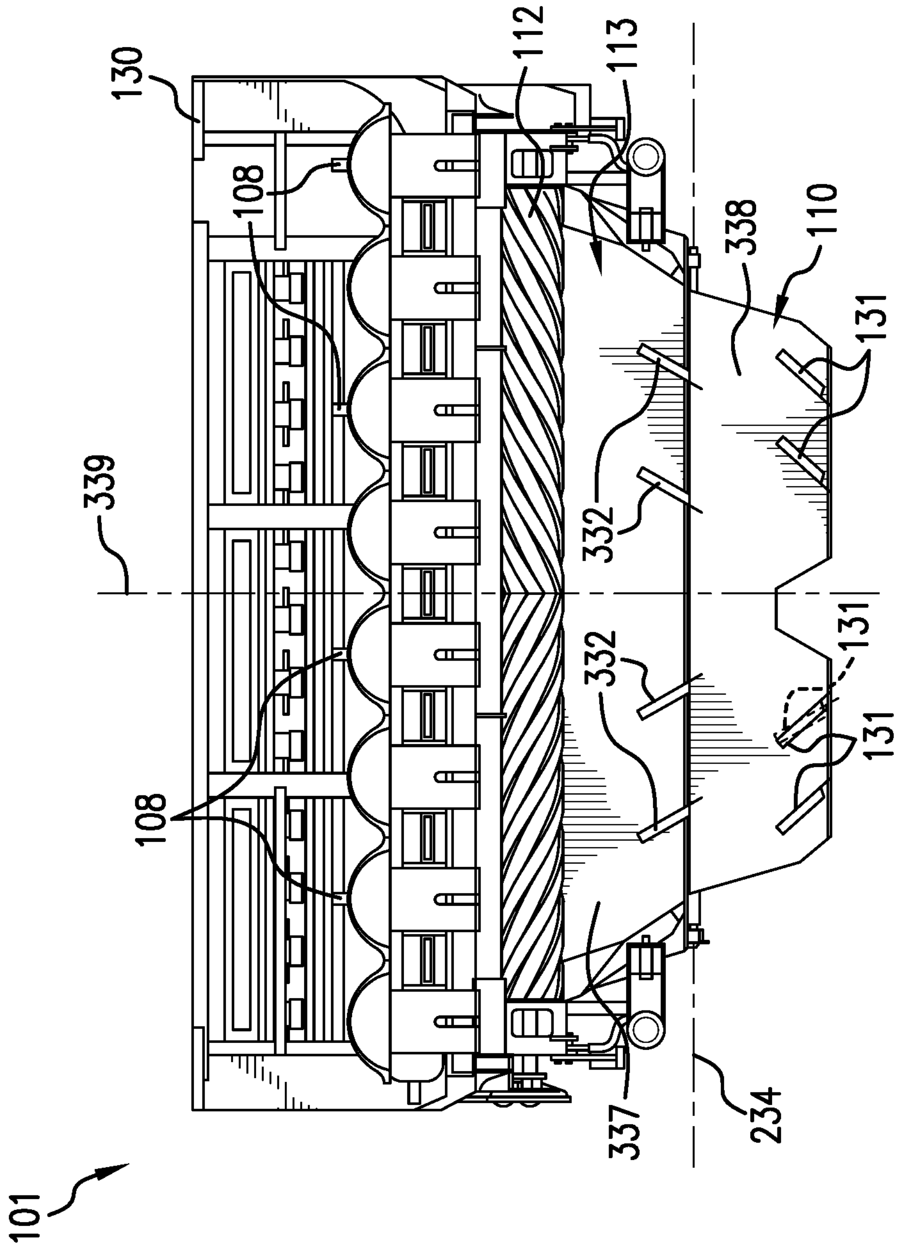
FIG. 3 illustrates schematically a bottom view of the mower-conditioner machine of FIG. 1, with portions broken away, in accordance with an exemplary embodiment of the present invention.
Figure 4:
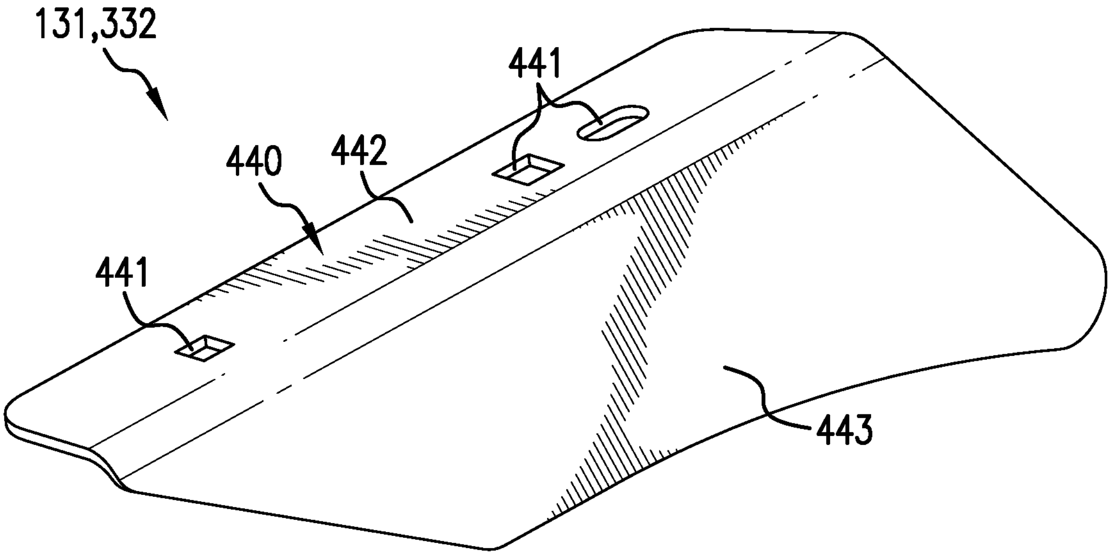
FIG. 4 illustrates a perspective view of a fin of the mower-conditioner machine of FIG. 1, in accordance with an exemplary embodiment of the present invention.

Referring now to FIG. 3, there is shown a bottom view of mower-conditioner 101, with portions broken away. The forward end of mower-conditioner 101 is to the top of the page of FIG. 3. Mower-conditioner 101 is shown to include blades of cutting mechanism 108, as well as a conditioner roll 112, hood 113, and swath gate 110, which is pivotable about axis 234. Hood 113 and swath gate 110 can be made of any suitable material or combination of materials (such as a metal (such as steel, optionally, stainless steel) and/or a polymer) and can be coupled with frame 130 in any suitable manner. Hood 113 and swath gate 110 include crop control surfaces 337 and 338 on a bottom of hood 113 and swath gate 110, respectively, each of control surfaces 337, 338 being configured to be engaged by the flow of crop material 136, which flows from cutting mechanism 108, to conditioner rolls 112, to hood 113, and to swath gate 110, at least substantially in that order. Hood 113 and swath gate 110 further include fins 332 and 131 attached to crop control surfaces 337 and 338, respectively. Fins 332, 131 are substantially similar to one another (though they need not be so). Fins 332, 131 can be made of any suitable material, such as a metal (i.e., steel, optionally stainless steel) and/or a polymer, can be made in any suitable manner (for example, stamping and bending), and can be attached to crop control surfaces 337, 338, respectively, in any suitable manner, such as by way of an adhesive, fasteners, or the like. According to an exemplary embodiment of the present invention, each of fins 332, 131 can have a side profile substantially similar to what is shown in FIG. 4 (see also FIG. 1 with respect to fin 131). Further, fins 332, 131, as shown in FIG. 3, can be positioned so that a portion of fins 332, 131 extends aft of hood 113 and swath gate 110, respectively. Fins 332 are configured for directing (more specifically, redirecting) the flow of crop material 136 from conditioner 109, and fins 131 are configured for directing the flow of crop material 136 from hood 113. Thus, fins 332 advantageously begin converging crop material 136 at least nearly as soon as possible after conditioner 109 (in order, for example, to reduce the width of the mat of crop material 136 from very wide to relatively narrow), and fins 131 can be used to fine-tune what will be the final disposition of the swath or windrow on the ground.

Fins 332, 131 are configured for directing the flow of crop material 136 inwardly with respect to a longitudinally extending midline 339 of mower-conditioner 101. Thus, with respect to the positioning of fins 332, 131 respectively on crop control surfaces 337, 338, the overall positioning of fins 332, 131 is such that crop material 136 converges inwardly so as to reduce the width of the mat of crop material 136 flowing from conditioner 109. According to an exemplary embodiment of the present invention, each of fins 332, 131 are angled inwardly in a flow direction with respect to the longitudinally extending midline 339 of mower-conditioner 101, as shown in FIG. 3. Further, according to an exemplary embodiment of the present invention as shown in FIG. 3, fins 332 on respective lateral sides of midline 339 are parallel to one another, as are fins 131 with respect to one another as well. Further, fins 332 and 131 on respective sides of midline 339 can be parallel to one another (that is, on one side of midline 339, fins 332 and 131 are parallel to one another, as can occur on the other side of midline 339); such parallelism of fins 332, 131 is shown, by way of example, with one broken line fin 131 which is parallel with the left-side fins 332. The greater the degree of parallelism of fins 332, 131 can produce correspondingly a greater degree of laminarity of the flow of crop material 136.

Alternatively, fins 332 and/or fins 131 can have non-parallel aspects. For instance, in FIG. 3, though fins 332 are parallel to one another on a respective side of midline 339 and fins 131 are also parallel to one another on a respective side of midline 339, fins 332 and 131 (that is, the fins 131 in solid lines) are not parallel to each other on a respective side of the midline 339; instead, fins 131 are angled even more with respect to midline 339 so as to produce even more convergence of the flow of crop material, as compared to fins 332. In this way, fins 131 on swath gate 110 can be arranged so as to provide fine-tuning of the convergence of crop material so as to reduce the width of the mat of crop material 136. Further, such non-parallelism can provide a measure of disruption (and thus turbulence) to the laminarity of the flow of crop material, with the result that crop material 136 eventually lands and thus lies on the ground in a way that can facilitate more airflow within the swath or windrow and thereby promote faster drying of crop material 136 on the ground. Alternatively, selected one(s) of fins 332 on a respective side of midline 339 can be non-parallel with respect to other ones of fins 332, though the overall arrangement of fins 332, 131 is such that the flow of crop material 136 still converges so as to reduce the width of the mat of crop material flowing from conditioner 109 (such non-parallelism of fins 332 can occur on either or both sides of midline 339, and fins 131 can be arranged to exhibit such non-parallelism as well). Such non-parallelism can provide an enhanced measure of disruption (and thus turbulence) to the flow of crop material 136, so as to further increase faster dry-down of crop material 136.

Further, fins 332, 131 can be fixed or adjustable. That is, fins 332, 331 can be fixed in position so as not to be adjustable with respect to the angle fins 332, 131 make with the midline 339. Alternatively, fins 332, 131 can be adjustable so that the angle that fins 332, 131 make with the midline 339 can be changed. Such adjustments can be made manually by the user and/or automatically by way of a control system. According to an exemplary embodiment of the present invention, fins 332 on hood 113 can be fixed (not adjustable), and fins 131 on swath gate 110 can adjustable, depending for example on crop conditions. For example, fins 131 may be angled inwards relative to midline 339 (causing crop material 136 to converge), or, alternatively, may be angled parallel to midline 339, or, alternatively, may even be angled outwardly relative to midline 339 (causing crop material 136 to diverge from one another rather than converge) in order to aid in depositing a uniform swath or windrow with an even cross-section.

Referring now to FIG. 4, there is shown a perspective view of a single fin 332, 131. Each fin 332, 131, according to an exemplar embodiment of the present invention, includes a body 440 including a base 442 and a crop-directing portion 443. Base 442 includes fastener holes 441 such that fasteners (not shown) can connect fin 332, 131 with hood 113 and swath gate 110, respectively. Body 440 can be formed from a metal plate (such as sheet metal) which is bent to form base 442 and crop-directing portion 443 (such that base 442 and crop-directing portion 443 have substantially the same thickness). The forward end of fin 332, 131 is to the left on the page of FIG. 4.

Figure 5:
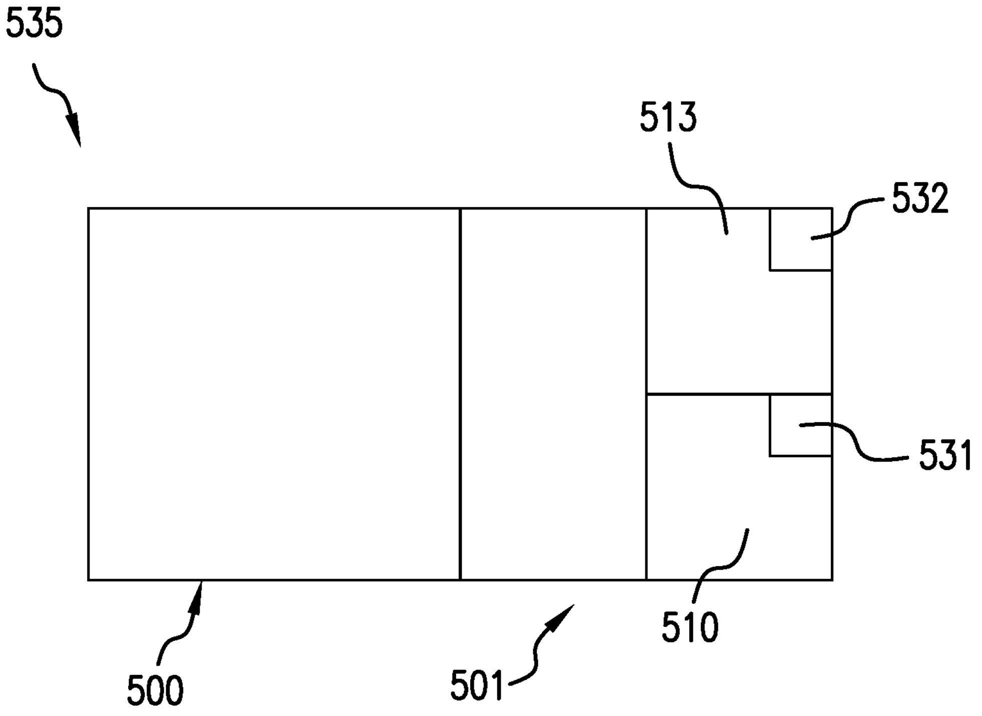
FIG. 5 illustrates schematically a general embodiment of the agricultural machine system, in accordance with an exemplary embodiment of the present invention.

Referring now to FIG. 5, there is shown a general embodiment of the present invention. That is, there is shown agricultural machine system 535. Prior reference numbers with respect to agricultural machine system 135 are increased by a multiple of 100 and thus are substantially similar to the structures and function described and shown with respect to FIGS. 1-4, unless otherwise shown and/or described differently and/or are inherently or implicitly different. Thus, agricultural machine system 135 is labeled as 535 in FIG. 5. Agricultural machine system 535 is shown schematically and includes all embodiments of the present invention previously shown and/or described above. Thus, agricultural machine system 535 includes agricultural work vehicle 500 and mower-conditioner machine 501, which includes hood 513 and swath gate 510, with hood 513 including fins 532 and swath gate 510 including fins 531. Instead of vehicle 500 being a self-propelled windrower and mower-conditioner machine 501 being a push-type header mower-conditioner as described above, both vehicle 500 and mower-conditioner 501 can vary. That is, vehicle 500 can be, for instance, a tractor. Further, mower-conditioner 501 can be, for example, a pull-type mower-conditioner, such as a pull-type disc mower-conditioner (PTDMC), though a sicklebar can be used in place of the discs as cutting mechanism 108. Alternatively, mower-conditioner 501 can be, for example, a side-pull disc header mower-conditioner (SPDH).

In use, agricultural machine system 135, 535, such as mower-conditioner 101, 501 attached as a header to self-propelled windrower 100, 500, is operated through a field of crop material 136. As system 135, 535 progresses through the field, cutting mechanism 108 cuts crop material 136, sending crop material 136 through conditioner rolls 112, then to crop control surface 337 of hood 113 thereby and thereby engaging fins 332, 532, then to crop control surface 338 of swath gate 110 and thereby engaging fins 131, 531, and then to the ground. When crop material 136 engages fins 332, 532, the flow of crop material 136 is directed laterally inwardly towards midline 339 so as to reduce the width of the mat of crop material flowing from conditioner 112. When crop material 136 engages fins 131, 531, the flow of crop material 136 is directed further laterally inwardly towards midline 339, thereby further reducing the width of the crop material 136.

Figure 6:
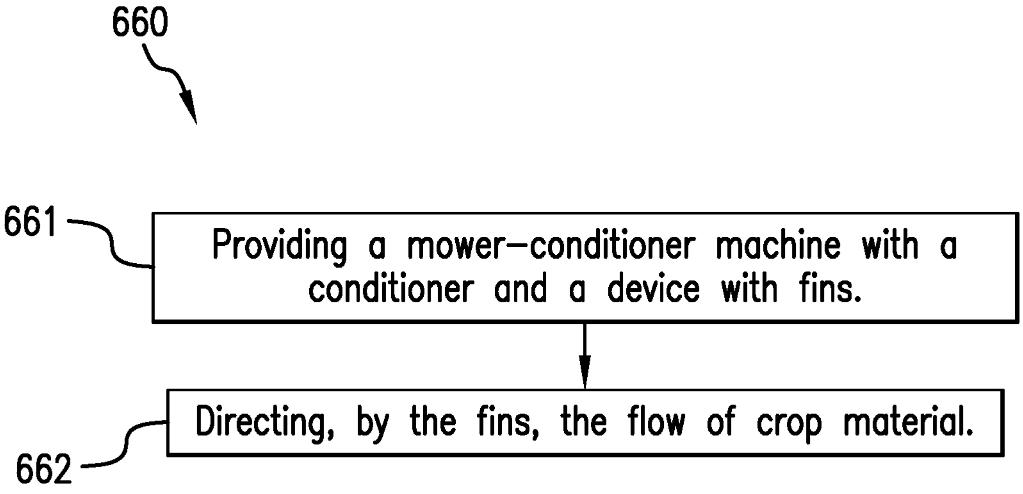
FIG. 6 illustrates a flow diagram showing a method of using an agricultural machine system, in accordance with an exemplary embodiment of the present invention.

Referring now to FIG. 6, there is shown a flow diagram showing a method 660 of using an agricultural machine system 135, 535, the method 660 including the steps of:

providing 661 the agricultural machine system 135, 535, which includes an agricultural work vehicle 100, 500 and a mower-conditioner machine 101, 501, the agricultural work vehicle 100, 500 including an agricultural work vehicle frame 104, the mower-conditioner machine 101, 501 being coupled with the agricultural work vehicle frame 104 and including a mower-conditioner machine frame 130, a conditioner 109 coupled with the mower-conditioner machine frame 130, a swath gate 110, 510 coupled with the mower-conditioner machine frame 130 and configured for encountering a flow of a crop material 136, and a device 113, 513 coupled with the mower-conditioner machine frame 130; and directing 662, by a plurality of fins 332, 532 of the device 113, 513, a flow of the crop material 136 from the conditioner 109. The agricultural work vehicle 100, 500 can be a self-propelled windrower 100, 500, and the mower-conditioner machine 101, 501 can be a header 101, 501. The device 113, 513 is a hood 113, 513 and is positioned upstream of the swath gate 110, 510, the plurality of fins 332, 532 being configured for directing the flow of the crop material 136 inwardly. The hood 113, 513 is fixed relative to the mower-conditioner machine frame 130, and the swath gate 110, 510 is configured for pivoting relative to the mower-conditioner machine frame 130. The plurality of fins 332, 532 is a first plurality of fins 332, 532, the swath gate 110, 510 including a second plurality of fins 131, 531 configured for directing the flow of the crop material 136.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural machine system, comprising:

an agricultural work vehicle including an agricultural work vehicle frame;

a mower-conditioner machine coupled with the agricultural work vehicle frame and including:

a mower-conditioner machine frame;

a conditioner coupled with the mower-conditioner machine frame, the conditioner comprising two conditioner rolls;

a swath gate coupled with the mower-conditioner machine frame and configured for encountering a flow of a crop material;

a hood coupled with the mower-conditioner machine frame, and including a plurality of fins configured for directing a flow of the crop material from the conditioner, wherein a leading end of the plurality of fins extends aft of an outlet of the conditioner; and the hood being positioned upstream of the swath gate, the plurality of fins being configured for directing the flow of the crop material inwardly, and wherein the hood is fixed relative to the mower-conditioner machine frame, and the swath gate is configured for pivoting relative to the mower-conditioner machine frame.

2. The agricultural machine system of claim 1, wherein the agricultural work vehicle is a self-propelled windrower, and the mower-conditioner machine is a header.

3. The agricultural machine system of claim 1, wherein the plurality of fins is a first plurality of fins, the swath gate including a second plurality of fins configured for directing the flow of the crop material.

4. The agricultural machine system of claim 3, wherein the first plurality of fins and the second plurality of fins are parallel to one another on a respective side of a longitudinally extending midline of the mower-conditioner machine.

5. The agricultural machine system of claim 3, wherein the first plurality of fins are parallel to one another on a respective side of a longitudinally extending midline of the mower-conditioner machine, and the second plurality of fins are parallel to one another on a respective side of the longitudinally extending midline of the mower-conditioner machine.

6. The agricultural machine system of claim 3, wherein an angle of the second plurality of fins with respect to a longitudinally extending midline of the mower-conditioner machine is greater than an angle of the first plurality of fins with respect to the longitudinally extending midline of the mower-conditioner machine.

7. The agricultural machine system of claim 1, wherein the plurality of fins each comprise a body including a base and a crop-directing portion, the base including fastener holes configured to connect the fin to the hood.

8. The agricultural machine system of claim 1, wherein the hood and the swath gate include crop control surfaces on a bottom of the hood and the swath gate, each of control surfaces being configured to be engaged by the flow of crop material, which flows from a cutting mechanism, to the conditioner, to the hood, and to the swath gate at least substantially in that order.

9. The agricultural machine system of claim 1, wherein the two conditioner rolls rotate opposite of one another.

10. The agricultural machine system of claim 9, wherein a top roll of the two conditioner rolls rotates in a clockwise direction and a bottom roll of the two conditioner rolls rotates in a counterclockwise direction and form a gap between the top roll and the bottom roll through which the crop material flows.

11. The agricultural machine system of claim 1, wherein the hood is downstream of the outlet of the conditioner.

12. A mower-conditioner machine of an agricultural machine system, the agricultural machine system including an agricultural work vehicle including an agricultural work vehicle frame, the mower-conditioner machine being coupled with the agricultural work vehicle frame, the mower-conditioner machine comprising:

a mower-conditioner machine frame;

a conditioner coupled with the mower-conditioner machine frame, the conditioner comprising two conditioner rolls;

a swath gate coupled with the mower-conditioner machine frame and configured for encountering a flow of a crop material; and a hood coupled with the mower-conditioner machine frame, and including a plurality of fins configured for directing a flow of the crop material from the conditioner, wherein a leading end of the plurality of fins extends aft of an outlet of the conditioner; and the hood being positioned upstream of the swath gate, the plurality of fins being configured for directing the flow of the crop material inwardly, and wherein the hood is fixed relative to the mower-conditioner machine frame, and the swath gate is configured for pivoting relative to the mower-conditioner machine frame.

13. The mower-conditioner machine of claim 12, wherein the mower-conditioner machine is a header which is configured for coupling with the agricultural work vehicle formed as a self-propelled windrower.

14. The mower-conditioner machine of claim 12, wherein the plurality of fins is a first plurality of fins, the swath gate including a second plurality of fins configured for directing the flow of the crop material.

15. The mower-conditioner machine of claim 12, wherein the hood is downstream of the outlet of the conditioner.

16. A method of using an agricultural machine system, the method comprising the steps of:

providing the agricultural machine system, which includes an agricultural work vehicle and a mower-conditioner machine, the agricultural work vehicle including an agricultural work vehicle frame, the mower-conditioner machine being coupled with the agricultural work vehicle frame and including a mower-conditioner machine frame, a conditioner coupled with the mower-conditioner machine frame, the conditioner comprising two conditioner rolls, a swath gate coupled with the mower-conditioner machine frame and configured for encountering a flow of a crop material, and a hood coupled with the mower-conditioner machine frame, the hood being positioned upstream of the swath gate, a plurality of fins being configured for directing the flow of the crop material inwardly, and wherein the hood is fixed relative to the mower-conditioner machine frame, and the swath gate is configured for pivoting relative to the mower-conditioner machine frame; and directing, by the plurality of fins of the hood, a flow of the crop material from the conditioner, and wherein a leading end of the plurality of fins extends aft of an outlet of the conditioner.

17. The method of claim 16, wherein the agricultural work vehicle is a self-propelled windrower, and the mower-conditioner machine is a header.

18. The method of claim 16, wherein the plurality of fins is a first plurality of fins, the swath gate including a second plurality of fins configured for directing the flow of the crop material.

19. The method of claim 16, wherein the hood is downstream of the outlet of the conditioner.

* * * * *